(No Model.)  3 Sheets—Sheet 1.

T. W. CARRICO.
COMBINED SAND AND GRAVEL WASHER.

No. 393,295. Patented Nov. 20, 1888.

Witnesses.
Edwin L. Bradford
Frank Dorian

Inventor,
Thomas W. Carrico,
By his Attorney
Chas. O. Barber (No Model.) 3 Sheets—Sheet 2.

T. W. CARRICO.
COMBINED SAND AND GRAVEL WASHER.

No. 393,295. Patented Nov. 20, 1888.

Witnesses.
Edwin L. Bradford,
Frank Dorian.

Inventor.
Thomas W. Carrico,
By his Attorney
Chas. E. Barton (No Model.) 3 Sheets—Sheet 3.
T. W. CARRICO.
COMBINED SAND AND GRAVEL WASHER.
No. 393,295. Patented Nov. 20, 1888.
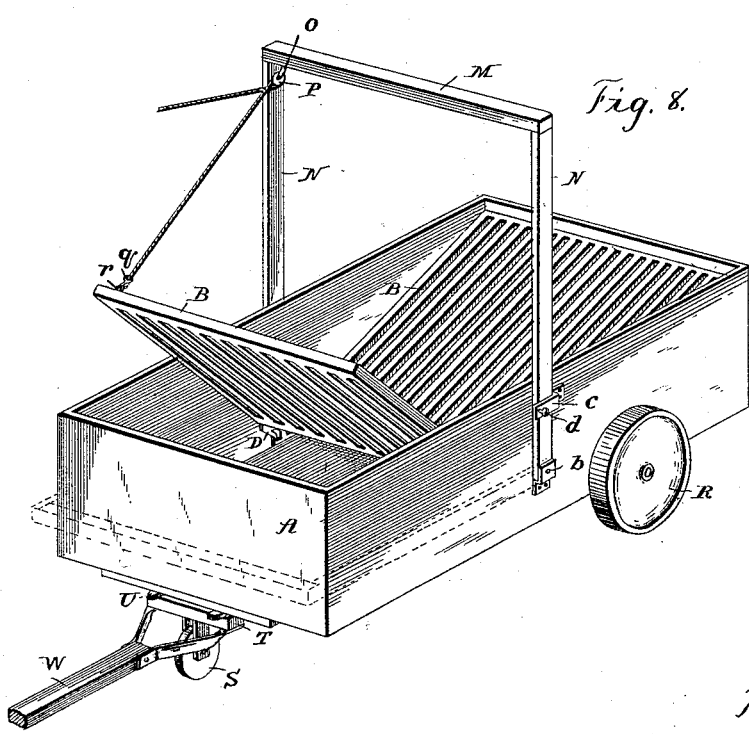
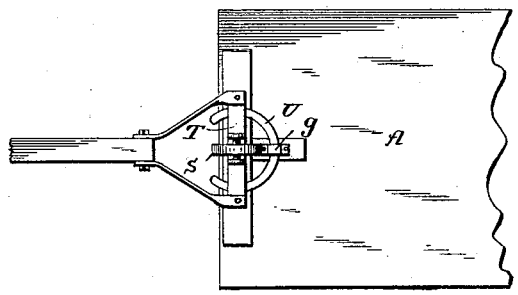
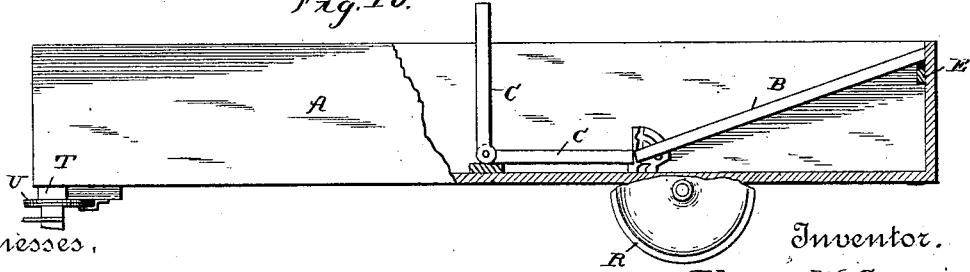
Witnesses,
Edwin L. Bradford,
Frank Dorian.
Inventor,
Thomas W. Carrico
By his Attorney
Chas. A. S. Barbin

United States Patent Office.

THOMAS W. CARRICO, OF SAN ANTONIO, TEXAS.

COMBINED SAND AND GRAVEL WASHER.

SPECIFICATION forming part of Letters Patent No. 393,295, dated November 20, 1888.

Application filed May 9, 1888. Serial No. 273,295. (No model.)

*To all whom it may concern:*

Be it known that I, THOMAS W. CARRICO, a citizen of the United States, residing at San Antonio, in the county of Bexar and State of Texas, have invented a certain new and useful Improvement in Combined Sand and Gravel Washers, of which the following is so full, clear, and exact a description as will enable others skilled in the art to which my invention appertains to make and use the same, reference being had to the accompanying drawings, in which—

Figure 1:
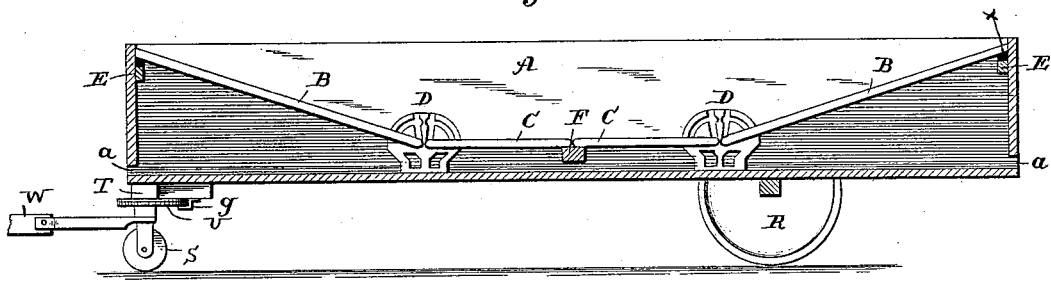
Figure 2:
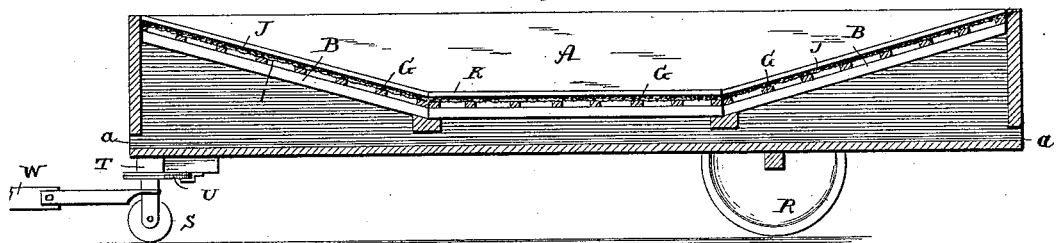
Figure 3:
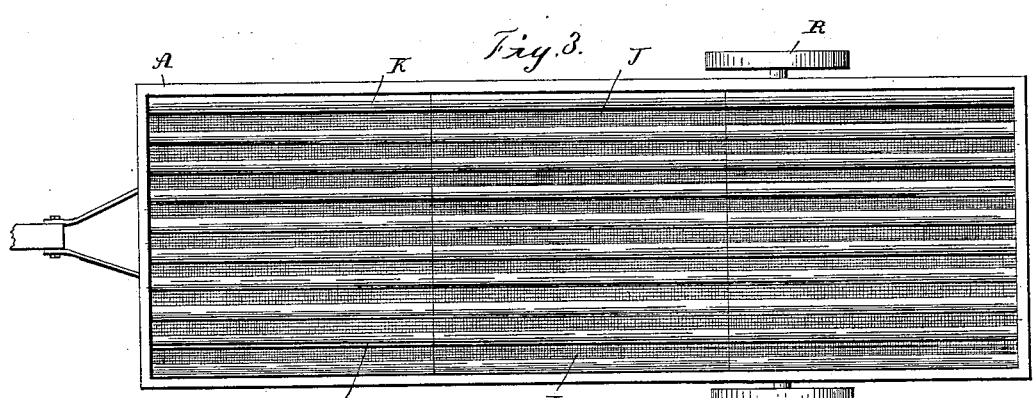
Figure 4:
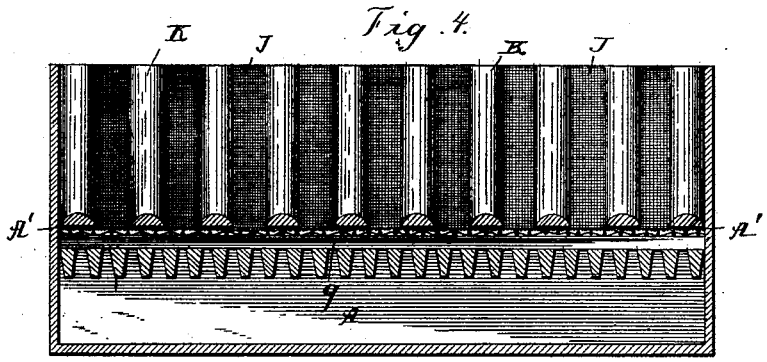
Figure 5:
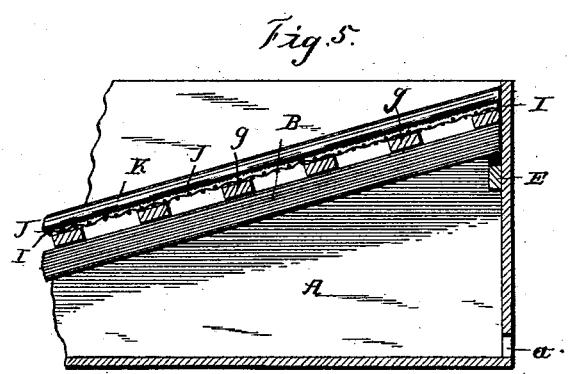
Figure 6:
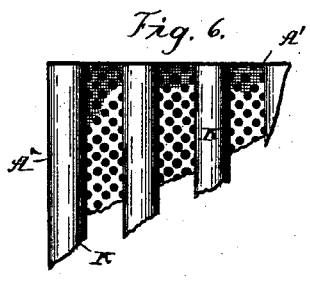
Figure 7:
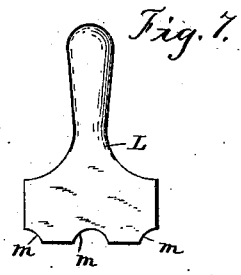

Figure 1 is a longitudinal vertical section of my improved washer, showing the grating in place. Fig. 2 is a similar view showing the screen on top of the grating. Fig. 3 is a top plan view of the same. Fig. 4 is a transverse vertical section of Fig. 2. Fig. 5 is an enlarged detail view of a portion of Fig. 2. Fig. 6 shows the perforated sheet-metal fine screen and slats, to be hereinafter described. Fig. 7 shows a cleaning device for the same. Fig. 8 shows a washer provided with hoisting apparatus for removing the grates. Fig. 9 is a detail bottom plan view of the washer and the front wheel for the same. Fig. 10 is a view of modified form of central grating for the washer.

The object of my invention is to construct a combined gravel and sand washing box which shall effectually serve as a means for practically removing all sand and dirt from gravel and stones and all mud and fine dirt from sand.

Another object of my invention is to construct a device the inside working parts of which may be easily and quickly manipulated in the shortest possible time with the least expense of physical force.

Another object of my invention is to construct a box which may be easily moved along from place to place and shifted at will.

The same letters of reference designate similar parts throughout the accompanying specification.

A designates the main box, provided with outlets $a$ $a$ and having an internal grating made in sections, B B, which are arranged diagonally across the ends of the box, and central sections, C C, which are hinged, as shown in Fig. 1 or 10.

D D designate pivotal bearings for the grates, and these bearings and grate supports generally will be found fully described in my patent of the 28th day of February, 1888, No. 378,765.

E E designate cleats which support the outer ends of the grating, while the central cleat, F, supports the central free ends of the grates C C.

In the device shown in Fig. 2 the grates are not hinged, but are shown removable by simply lifting them out. When it is desired to wash sand, I place strips G G transversely across the grates B and place upon these strips G G a coarse wire screen, I. Above this screen I place a finer screen, J, to the top of which is secured strips K K, which will serve to stiffen the finer screen and to protect it against rupture from the shovel and hose or other implement which may be used during the process of washing the sand. When the top screen becomes clogged or soiled to any extent, it can be cleaned by the use of the paddle L, having the recesses $m$ $m$, as shown in Fig. 7.

In the device shown in Fig. 8 the grate B may be lifted up by the use of the cross-piece M, which is supported on the pivotal bars N, which in turn are pivotally secured to the box at $b$. A clip, $c$, is provided with a pin, $d$, which serves to hold the bars N N in a perpendicular position when the hoisting apparatus is used. A block and tackle, P, is secured to the cross-piece M at $o$, and is provided with a hook, $q$, which hooks into a staple, $r$, on the grate B; or the hook may be made a little larger and hook right through one of the interstices between the grates. The cross-piece M may fold down in front of the box entirely out of the way when not in use, as is clearly shown in dotted lines in Fig. 8. The box is mounted on wheels R R at its sides, and a small pivotal wheel, S, placed centrally in front. The wheel S is secured to a platform, T, which is pivotally secured to the bottom of the box directly over the center of the wheel and axle S, and bears upon a curved friction-plate, U, which works through a loop, $g$, as shown in Fig. 9. There are two of the plates U U, (seen best in Figs. 1 and 2,) one secured to the box and the other to the frame which supports the wheel S, and they are adapted to move upon each other.

It will be obvious that in using the sand-washer described above there will be no sand lost, as the strainer or screen is made so fine that no good sand will pass through it, while the dirt and muddy water will readily pass through. I find it advisable when washing sand to leave the water-escapes in the ends of the box open to let the muddy water run off before the sediment has time to settle in the bottom of the box, being thus enabled to wash large quantities of sand without removing the grating to clean out the box.

The operation of my device for washing sand is as follows: When the gravel-washing grates are in position in the box, the screens are placed in position, being closely fitted at the sides and joints by the use of packing-strips A', of rubber, leather, or other suitable material, and the sand is then placed in the box and water allowed to run over it, at the same time stirring the sand briskly by means of a shovel, hoe, or other implement. This will cause the sand to become separated from the mud and other impurities, which will pass through the screen, while the sand will remain above the screen, and can then be removed by a shovel or in any suitable way. The sand should be dry-screened before being placed in the washing-box. Before removing the screen from the washing-box it may be scraped by the paddle L, which is formed to fit over the strips on the screen, and all the sand will be removed therefrom.

Heretofore great difficulty has been experienced in moving wash-boxes from place to place around the building or around a sand heap, or from one building to another, requiring ordinarily from four to six men to stir the box at all, and making its removal from place to place entirely impracticable without the use of a truck upon which to place the box. By the use of my device one man can pull it around and turn it any way, and when it is desired to move it any considerable distance this can be effected by fastening the pole W to the rear axle of a wagon or cart without the necessity of lifting the box off the ground.

I do not wish to be understood as limiting myself to the exact construction shown and described, as it is obvious that many of the details of construction may be altered and mechanical equivalents substituted therefor without departing from and without in any way interfering with the usefulness of my invention.

Having now described the objects, uses, and advantage of my device, and having shown a preferred form of carrying the same into practice, what I desire to secure by Letters Patent, and what I therefore claim, is—

1. A main box having a hoisting apparatus pivotally secured thereto, in combination with grating pivotally secured within the box and adapted to be raised on its pivotal bearing by the hoisting apparatus, substantially as described.

2. The combination of the main box having gratings B B at each end, and a central grating-section arranged horizontally within the box between the end sections, B B, and hinged centrally, substantially as shown and described.

In testimony whereof I affix my signature in the presence of two witnesses.

THOMAS W. CARRICO.

Witnesses:
CHAS. S. EBERHARDT,
JOHN REINBOLD.